(12) United States Patent
Desbois et al.

(10) Patent No.: US 10,017,609 B2
(45) Date of Patent: Jul. 10, 2018

(54) BATCH PROCESS FOR PREPARING POLYAMIDES

(75) Inventors: Philippe Desbois, Edingen-Neckarhausen (DE); Faissal-Ali El-Toufaili, Ludwigshafen (DE); Michael Gall, Neustadt (DE); Andreas Wollny, Ludwigshafen (DE)

(73) Assignee: BASF SE (DE)

( * ) Notice: Subject to any disclaimer, the term of this patent is extended or adjusted under 35 U.S.C. 154(b) by 456 days.

(21) Appl. No.: 13/058,779

(22) PCT Filed: Aug. 14, 2009

(86) PCT No.: PCT/EP2009/060532
§ 371 (c)(1),
(2), (4) Date: Feb. 11, 2011

(87) PCT Pub. No.: WO2010/018220
PCT Pub. Date: Feb. 18, 2010

(65) Prior Publication Data
US 2011/0144300 A1    Jun. 16, 2011

(30) Foreign Application Priority Data
Aug. 14, 2008 (EP) .................................. 08162409

(51) Int. Cl.
*C08G 69/28* (2006.01)
*B29C 47/00* (2006.01)
*C08G 69/26* (2006.01)
*C08G 69/30* (2006.01)
*C08G 69/36* (2006.01)
*C08G 69/46* (2006.01)
*B29C 47/76* (2006.01)

(52) U.S. Cl.
CPC .......... *C08G 69/28* (2013.01); *B29C 47/0014* (2013.01); *B29C 47/0021* (2013.01); *C08G 69/26* (2013.01); *C08G 69/265* (2013.01); *C08G 69/30* (2013.01); *C08G 69/36* (2013.01); *C08G 69/46* (2013.01); *B29C 47/762* (2013.01)

(58) Field of Classification Search
CPC ................................ C08G 69/06; C08G 69/28
USPC .............. 528/329.1, 323–326, 332–349
See application file for complete search history.

(56) References Cited

U.S. PATENT DOCUMENTS

| 3,489,724 | A | * | 1/1970 | Iwakura et al. | ............... 528/324 |
| 3,579,414 | A | * | 5/1971 | Ueda et al. | .................... 428/373 |
| 4,097,469 | A | | 6/1978 | Shue | |
| 4,760,129 | A | * | 7/1988 | Haering et al. | ............... 528/481 |
| 4,963,646 | A | | 10/1990 | Galland et al. | |
| 5,079,307 | A | | 1/1992 | Taylor et al. | |
| 5,362,846 | A | * | 11/1994 | Sage | ............................. 528/344 |
| 5,416,189 | A | | 5/1995 | Vandevijver et al. | |
| 6,156,869 | A | * | 12/2000 | Tamura et al. | ............... 528/310 |
| 6,166,171 | A | * | 12/2000 | Yamamoto et al. | .......... 528/310 |
| 6,169,162 | B1 | * | 1/2001 | Bush et al. | .................... 528/310 |
| 6,187,877 | B1 | | 2/2001 | Gotz et al. | |
| 2002/0132964 | A1 | | 9/2002 | Tanaka et al. | |
| 2004/0051198 | A1 | * | 3/2004 | Yamada et al. | ................. 264/83 |
| 2005/0245410 | A1 | * | 11/2005 | Tezuka et al. | ................ 510/175 |
| 2008/0051527 | A1 | | 2/2008 | Wiltzer et al. | |
| 2010/0190934 | A1 | | 7/2010 | Desbois et al. | |
| 2010/0190952 | A1 | | 7/2010 | Desbois et al. | |
| 2010/0311918 | A1 | | 12/2010 | El Toufaili et al. | |
| 2011/0092645 | A1 | | 4/2011 | Loth et al. | |

FOREIGN PATENT DOCUMENTS

| DE | 2715860 | 10/1977 |
| DE | 4337353 | 5/1994 |
| DE | 19514145 | 10/1996 |
| DE | 102004029935 | 1/2006 |
| EP | 0410649 | 1/1991 |
| EP | 0693515 | 1/1996 |
| EP | 1225191 | 7/2002 |
| JP | 2004204027 A | * 7/2004 |

OTHER PUBLICATIONS

Rauwendaal (Polymer Extrusion, Revised 4th Edition, Carl Hanser Verlag, Munich 2001, pp. 11-14).*
U.S. Appl. No. 13/378,980, filed Mar. 1, 2012, Schmidt et al.
English-language translation of the International Preliminary Report on Patentability for international application PCT/EP2009/060532, dated May 2, 2011.

* cited by examiner

*Primary Examiner* — Rachel Kahn
(74) *Attorney, Agent, or Firm* — Drinker Biddle & Reath LLP

(57) ABSTRACT

Polyamides based on dicarboxylic acids and on diamines are produced in a batch process by
1) feeding the entire amount of monomer composed of dicarboxylic acids, of diamines, and, if appropriate, of further polyamide-forming monomers, in the desired stoichiometry, in a closed stirred-tank reactor,
2) heating the monomer mixture in the stirred-tank reactor, with stirring, and with setting of a certain pressure, to a desired reaction temperature for the production of a prepolymer,
3) if appropriate, completely or partially depressurizing the reaction mixture from stage 2),
4) if appropriate, carrying out further thermal treatment of the reaction mixture from stage 2) or 3), and
5) reacting the reaction mixture from stage 2), 3), or 4) in the melt in a vented extruder for further increase of the molecular weight, with discharge of water vapor, and without use of additional polyamide-forming monomers or of polyamides.

8 Claims, No Drawings

BATCH PROCESS FOR PREPARING POLYAMIDES

CROSS REFERENCE TO RELATED APPLICATIONS

This application is a national stage application under 35 U.S.C. § 371 of PCT/EP2009/060532, filed Aug. 14, 2009, which claims benefit to European application 08162409.0, filed Aug. 14, 2008, the entire disclosures of which are hereby incorporated by reference.

The invention relates to a batch process for the production of polyamides in a sequence composed of stirred-tank reactor and extruder.

The production of polyamides via reaction in stirred-tank reactors with a downstream extruder is known in principle. U.S. Pat. No. 4,963,646 describes the production of amorphous (co)polyamides through polycondensation of two prepolymers with mutually complementary end group excesses, in the melt, and downstream reaction of the two prepolymers in an extruder.

EP-A-0 410 649 relates to the reaction of monomers for the production of prepolymers which have an excess of diamine, and further downstream reaction in an extruder, with addition of diamines.

EP-A-0 693 515 relates to processes for the production of precondensates of semicrystalline or amorphous, thermoplastically processable semiaromatic polyamides and, respectively, copolyamides through salt formation from diamines and dicarboxylic acids, and reaction in an autoclave with control of the water vapor partial pressure, and specific temperature ranges and pressure ranges have to be maintained here as a function of amide concentration. A downstream reaction can be carried out in an extruder.

EP-A-1 225 191 relates to the production of polyamides by melt polycondensation where diamines and dicarboxylic acids are first reacted in a batch reactor which is followed by a melt retention tank and by a continuous second polymerization reactor.

DE-A-10 2004 029 935 relates to a process for the continuous production of copolyamides with melting points of more than about 265° C. through reaction initially in a stirred-tank cascade using a continuous procedure, and downstream reaction in an extruder.

Achievement of the desired stoichiometry is very difficult in these continuous production processes, since it is almost impossible to achieve the necessary fine control of feed of the diamine streams and dicarboxylic acid streams.

Separate infeed of further polyamides or starting monomers in an extruder is technically complicated, and conduct of the reaction, and also the product, are difficult to control.

It is an object of the present invention to provide a process for the production of polyamides which permits flexible production of polyamides and copolyamides with melting points of from 110 to 350° C., while avoiding deposits or fouling on the reactor walls. A further intention is to minimize the amounts of by-products formed. The process is intended to be technically uncomplicated and to permit a precise stoichiometry to be set in polyamides. A further intention is to avoid the introduction of additional water into the reaction system, which in turn has to be removed downstream. A further intention is to permit the production of polyamides at low temperatures and pressures.

According to the invention, the objects are achieved through a batch process for the production of polyamides, based on dicarboxylic acids and on diamines, by 1) feeding the entire amount of monomer composed of dicarboxylic acids, of diamines, and, if appropriate, of further polyamide-forming monomers, in the desired stoichiometry, in a closed stirred-tank reactor,
2) heating the monomer mixture in the stirred-tank reactor, with stirring, and with setting of a certain pressure, for example the autogenous pressure, to a desired reaction temperature for the production of a prepolymer,
3) if appropriate, completely or partially depressurizing the reaction mixture from stage 2),
4) if appropriate, carrying out further thermal treatment of the reaction mixture from stage 2) or 3), and
5) reacting the reaction mixture from stage 2), 3), or 4) in the melt in a vented extruder for further increase of the molecular weight, with discharge of water vapor, and without use of additional polyamide-forming monomers or of polyamides.

The prepolymer is a substance with low viscosity and with relatively high end group content, when compared with the final product.

The process of the invention has at least two stages, of which one is carried out batchwise in a stirred-tank reactor, while the second stage, which preferably immediately follows the stirred-tank reactor, is carried out in a vented extruder.

In contrast to known processes, all of the starting monomers, in the desired stoichiometry, are fed into the stirred-tank reactor, and no addition of water is needed here. There is also no need for any preliminary salt-formation stage.

A prepolymer with low viscosity is obtained in the stirred-tank reactor, thus avoiding the formation of deposits or fouling on the reactor walls.

The process of the invention begins by heating the material in the stirred-tank reactor under a certain, e.g. autogenous, pressure. Once the desired final temperature has been reached, the result is, for example, a constant (equilibrium) pressure. Once the desired temperature and the desired pressure, or constant pressure, have been reached, a vented extruder can be used for depressurization and further processing of the reaction mixture. According to another embodiment of the invention, the reaction mixture can be reacted for a further time at the target temperature and at the constant pressure before the vented extruder is used for depressurization. According to a third embodiment of the invention, it is possible to carry out partial or complete depressurization of the reaction mixture from the stirred-tank reactor, whereupon further thermal treatment of the reaction mixture can take place.

If pressure reduction in the stirred-tank reactor takes place slowly, the molecular weight of the prepolymer present in the equilibrium can be increased. After the pressure reduction, the temperature can be maintained, or lowered, or else increased. The pressure reduction leads to a rise in the melt viscosity in the reaction mixture, and the extent of the pressure reduction determines the final melt viscosity. In practice, it is preferable to select the pressure in such a way as to permit complete discharge of the prepolymer from the stirred-tank reactor. By way of example, the pressure is finally increased again, in order to permit complete discharge of the prepolymer from the stirred-tank reactor. As an alternative, the discharge can take place by way of a conveying unit.

The reaction in stage 2) typically takes place at a temperature in the range from 70 to 350° C., particularly preferably from 120 to 320° C. The maximum pressure here is preferably in the range from 3 to 100 bar, particularly preferably from 5 to 50 bar. The temperature in the stirred-tank reactor here is continuously increased to the target temperature. Once the target temperature has been reached, the reaction mixture can preferably be kept for a period of from 5 minutes to 48 hours at said temperature. The autogenous pressure can be released in advance, completely or to some extent.

Stages 1) to 4) are preferably carried out in the same stirred-tank reactor, in such a way that the vented extruder of stage 5 immediately follows the (first) stirred-tank reactor.

The total residence time in the stirred-tank reactor is preferably from 10 minutes to 48 hours, particularly preferably from 0.5 to 12 hours. The heating here to the desired maximum temperature preferably takes place within a period of from 2 minutes to 32 hours, particularly preferably from 0.3 to 10 hours.

The reaction of dicarboxylic acids and of diamines in stage 2) produces water or water vapor. Polyamides or prepolymers can be formed here at low temperatures, and the viscosity of the reaction product remains very low, and formation of deposits can therefore be avoided. The intrinsic viscosity of the prepolymer is preferably in the range from 3 to 200 ml/g, determined by solution viscometry. The polyamide specimens were dissolved in 96±0.1% sulfuric acid in order to prepare a 0.5% strength by weight polymer solution. The flow time of the solvent and, of the polymer solution were determined at 25±0.05° C. water bath temperature in an Ubbelohde viscometer. The reaction in the stirred-tank reactor is preferably terminated once conversion has reached the range from 50 to 97%, particularly preferably about 80%, based on amino and carboxy groups. An equilibrium state is achieved when about 50-97% of the functional end groups, i.e. carboxy and amino end groups, have been reacted to give amide bonds. A corresponding amount of water is produced here. This mixture composed of low-molecular-weight polyamide and water can be discharged through the vented extruder, which is preferably self-purging, in order to remove the water present in the equilibrium and to increase the molecular weight to the desired value.

A further advantage of the process of the invention is that polycondensation can start from the bulk monomers, without any addition of water or prior formation of monomer salts. This step saves the energy which otherwise would be required to evaporate the added water (amounts in the range from 20 to 60% of water addition being typical in known processes).

In the process of the invention, the polyamides are produced starting from dicarboxylic acids and from diamines and preferably without (prior) formation of monomer salts. If appropriate, further polyamide-forming monomers can be used, examples being lactams, amino acids, or aminonitriles. The content of further polyamide-forming monomers in the starting monomer mixture is preferably at most 95 mol %, based on the total amount of monomers.

Suitable diamines and dicarboxylic acids are known to the person skilled in the art. These can be aliphatic, cycloaliphatic, or semiaromatic diamines and/or dicarboxylic acids. Examples of dicarboxylic acids that may be mentioned are the linear terminal, aliphatic $C_{4-20}$ dicarboxylic acids, preferably $C_{4-8}$ dicarboxylic acids. Examples of these are adipic acid and sebacic acid. Phthalic acid, isophthalic acid, or terephthalic acid are examples of aromatic dicarboxylic acids.

The diamines used can likewise be linear aliphatic, terminal $C_{4-20}$ diamines, preferably $C_{4-8}$ diamines. Hexamethylenediamine is a typical representative. Aromatic or semiaromatic diamines can also be used, as also can cycloaliphatic diamines. Dicyclohexylmethyldiamine (dicycan) is an example of this type of diamine.

Among further polyamide-forming monomers that may be mentioned are lactams, such as caprolactam, and aminonitriles, such as aminocapronitrile, and similar compounds.

It is also possible to make concomitant use of tri- or tetrafunctional amines or carboxylic acids, and it is also possible to use terminating monomers, such as monocarboxylic acids or monoamines. Particular mention may be made here of concomitant use of HALS stabilizers, such as tetramethylpiperidine (TAD).

Semiaromatic, semicrystalline, thermoplastic copolyamides produced according to the invention with glass transition temperature above 80° C., advantageously above 120° C., and with crystallinity of at least 20%, produced by the process described, are composed of a) an aromatic dicarboxylic acid having from 8 to 16 carbon atoms, in particular terephthalic acid or isophthalic acid or a mixture of the two, and b) an aliphatic or aromatic diamine having from 4 to 14 carbon atoms, in particular butanediamine, methylpentamethylenediamine, hexamethylenediamine, octanediamine, methyloctanediamine (in particular 2-methyloctanediamine), nonanediamine, decanediamine, and dodecanediamine, or a mixture of the abovementioned, and also c) optionally a lactam having from 6 to 14 carbon atoms, preferably caprolactam, or an ω-aminocarboxylic acid having from 6 to 14 carbon atoms.

Said copolyamide is preferably composed of a) from 30 to 44 mol %, in particular from 32 to 40 mol %, of units that derive from terephthalic acid, b) from 6 to 20 mol %, in particular from 10 to 18 mol %, of units which derive from isophthalic acid, c) from 42 to 49.5 mol %, in particular from 45 to 48.5 mol %, of units which derive from hexamethylenediamine, and d) from 0.5 to 8 mol %, in particular from 1.5 to 5 mol %, of units which derive from a diamine which has from 6 to 30 carbon atoms and which includes an aromatic ring, in particular para-xylylenediamine, meta-xylylenediamine, ortho-xylylenediamine, alkyl-substituted xylylenediamines, or a mixture composed of abovementioned diamines, where the molar percentages of components a) to d) give a total of 100%, and the degree of crystallinity is advantageously greater than 20%.

As an alternative, the copolyamide described is preferably composed of e) terephthalic acid, hexamethylenediamine, and caprolactam, where the molar proportion of the three components, based on the total molar amount of the monomers in the mixture, is in each case from 20 to 50 mol %, and the total is 100%. Proportions in each case of from 30 to 40 mol % are preferably used here.

Other semicrystalline thermoplastic polyamides with a degree of crystallinity of at least 20%, produced by the process described, are composed of a) an aliphatic dicarboxylic acid having from 4 to 18 carbon atoms, in particular adipic acid, sebacic acid, dodecanedioic acid, tetradecanedioic acid, and octadecanedioic acid, or a mixture thereof, and b) an aliphatic diamine having from 4 to 16 carbon atoms, in particular butanediamine, hexamethylenediamine, octanediamine and decanediamine, or a mixture of these.

In particular, preference is given to a polyamide composed of hexamethylenediamine and adipic acid, or a polyamide composed of hexamethylenediamine and sebacic acid, dodecanedioic acid, or tetradecanedioic acid, or of a mixture of the dicarboxylic acids mentioned.

Amorphous or microcrystalline, transparent thermoplastic polyamide molding compositions with glass transition temperature above 50° C., advantageously above 90° C., produced by the process described are composed of a) a dicarboxylic acid selected from aliphatic dicarboxylic acids having from 6 to 16 carbon atoms, in particular adipic acid, sebacic acid, dodecanedioic acid and tetradecanedioic acid, or a mixture of these, or selected from aromatic dicarboxylic acids having from 8 to 12 carbon atoms, in particular isophthalic acid or terephthalic acid, or a mixture of the two, and b) an aliphatic diamine having from 6 to 12 carbon atoms, in particular composed of an aliphatic, branched diamine, in particular 2,2,4- or 2,4,4-trimethyl-hexanediamine or 2-methyl-1,5-pentanediamine, or composed of a cycloaliphatic diamine having from 6 to 24 carbon atoms, in particular 2,2-bis(4-aminocyclohexyl)propane ("dihexylan", "PACP", CAS 3377-024-0), in particular in a stereoisomeric composition of from 50 to 80% by weight (based on the isomers of said diamine) of the trans-trans isomer, where the remainder is composed of cis-trans and cis-cis isomers and the proportion of the cis-cis isomer is smaller than 10% by weight, 2,2-bis(3-methyl-4-aminocyclohexyl)propane ("dimethyldihexylane"), bis(4-amino-methylcyclohexyl)methane ("PACM", "dicycan"), 3,3'-dimethyl-4,4'-diaminodicyclohexylmethane ("MACM", "dimethyldicycan"), isophoronediamine (CAS 2855-13-2), meta-bis(aminomethyl)cyclohexane (CAS 2579-20-6), ortho-bis(aminomethyl)cyclohexane, para-bis(aminoethyl)cyclohexane, and also mixtures composed of abovementioned diamines, and copolyamides obtained from 30 to 80% by weight of the monomers described in a) and b) and from 20 to 70% by weight of lactams having from 6 to 14 carbon atoms (or corresponding ω-aminocarboxylic acids), or aliphatic diamines and dicarboxylic acids having from 4 to 18 carbon atoms, in particular caprolactam, laurolactam, or hexamethylenediamine/adipic acid.

Particular preference is given to a copolyamide composed of 2,2-bis(4-aminocyclohexyl)propane, hexamethylenediamine, and adipic acid with from 35 to 85% by weight of the 2,2-bis(4-aminocyclohexyl)propane/adipic acid component, where the 2,2-bis(4-aminocyclohexyl)propane advantageously contains a stereoisomeric composition of from 50 to 80% by weight of the trans-trans isomer, where the remainder is composed of cis-trans and cis-cis isomers, and the proportion of the cis-cis isomer is smaller than 10% by weight.

Other suitable polyamides are composed of a) from 12 to 30 mol % of an aliphatic or branched diamine having from 6 to 16 carbon atoms, in particular hexamethylenediamine or methyl-pentamethylenediamine, b) from 25 to 40 mol % of an aliphatic dicarboxylic acid having from 6 to 16 carbon atoms, in particular adipic acid or sebacic acid, c) from 10 to 28 mol % of a cycloaliphatic diamine having from 6 to 24 carbon atoms, in particular bis(4-aminomethylcyclohexyl)methane ("PACM", "dicycan") or 3,3'-dimethyl-4,4'-diaminodicyclohexylmethane ("MACK", "dimethyldicycan"), and d) from 20 to 42 mol % of a lactam having from 6 to 14 carbon atoms (or of a corresponding ω-aminocarboxylic acid), in particular caprolactam or laurolactam, where the quantitative molar proportions are based on the monomers in the mixture, and the total of the proportions is 100%.

Particular preference is given here to polyamides having the composition a) to d) which are soluble in water, in alcohols (in particular methanol, ethanol, or propanol), or in a mixture composed of water and alcohols.

The above polyamide molding compositions produced by the process described can also comprise a) from 0 to 50% by weight of a fibrous or particulate filler, b) from 0 to 30% by weight of an elastomeric polymer or impact modifier, and/or c) from 0 to 60% by weight of other additives and processing aids, in particular heat stabilizers, flame retardants, mold-release agents, or additives which improve the sliding-friction properties and/or the thermal and/or electrical conductivity of the polyamide molding composition according to the claims.

The polyamide molding compositions and polyamide preparations produced by the process of the invention can be used as a) fibers, foils, and moldings, in particular in the form of technical injection-molded components, or for injection around metal inserts, b) or else as blend component for polymer blends with other polymers, in particular with other polyamides, in particular with PA6 or PA6.6, and particularly here with a proportion by weight of from 1 to 50% by weight, especially from 10 to 40% by weight, of the above polyamides, c) a particular possibility being use of the solution of the corresponding polyamide, in particular in water, alcohols, or a mixture of water and alcohols, for example for stoving lacquers, or for coatings.

In stage 1), the dicarboxylic acids, diamines, and, if appropriate, other polyamide-forming monomers are fed in the desired stoichiometry into a closed stirred-tank reactor. A typical method here starts by weighing one of the monomers into the stirred-tank reactor, and introduces the other monomer until the desired stoichiometry has been reached. In a typical production process, the diamine monomers are weighed into a jacketed feed tank. The dicarboxylic acid monomers and other components, such as caprolactam, are weighed directly into the stirred-tank reactor. After addition of the diamines and homogenization of the reactants by heating to mild temperatures, with stirring, a specimen for titration can, for example, be taken in order to determine the concentration of end groups and the stoichiometry. Once the desired stoichiometry has been set, the reaction mixture is heated to the desired temperature and kept, with stirring, at this temperature until an equilibrium is achieved. The reaction pressure rises with the reaction time, since the polycondensation produces water. The pressure reaches a constant value at equilibrium. The final pressure value depends on the constitution of the reaction mixture and on the temperature. Once the equilibrium has been reached, the prepolymer can be discharged by way of the vented extruder. The stirred-tank reactor is preferably kept closed for the entire reaction time and discharge time.

In the processes of the prior art, a balance of the end groups is typically achieved by producing a salt solution from the monomers, and the balance here is achieved by setting a predetermined pH. Continuous feed of monomers directly into the reactor leads to fluctuations of end groups due to measurement inaccuracy, which is typically greater than the tolerance range. It is generally impossible to achieve precise feed from two or more pump systems. In contrast, when the monomer mixture is produced batchwise, determination of amino and carboxy end groups by acid/base titration can be used to determine the stoichiometry.

The batch process of the invention for the production of polyamides thus has the advantage that product constitution can be very specifically set. The process of the invention also has high flexibility, since the product can be changed rapidly. By virtue of the production process of the invention, having at least two stages, the melt viscosity of the product from the stirred-tank reactor can be kept low, and nevertheless the polyamides obtained at the end of the process can have high molecular weight.

In stage 3) of the process of the invention, the reaction mixture from stage 2) can be partially or completely depressurized. By way of example, depressurization takes place here to a pressure below the pressure in stage 2), e.g. in the range from 0.01 to 80 bar.

If appropriate, a further thermal treatment of the reaction mixture can take place after establishment of the equilibrium in stage 2), for example also after a pressure decrease. The further thermal treatment in stage 4) preferably takes place at a temperature in the range from 70 to 350° C. The material is preferably heated here at a pressure of from 0.1 to 30 bar for a period of from 2 minutes to 20 hours.

In stage 5), the reaction mixture from stage 2), 3), or 4) is further reacted in a vented extruder, in the melt. The molecular weight is further increased here, and water vapor is discharged. According to the invention, no addition of additional polyamide-forming monomers (e.g. dicarboxylic acids, diamines, or other monomers), or polyamides, takes place into the extruder. It is preferable that monomers are introduced only into the stirred-tank reactor, and that there is no infeed of polyamides in the entire process. The process of the invention thus differs markedly from the processes of the prior art.

The reaction in the vented extruder is preferably carried out at a temperature in the range from 120 to 370° C. Operations here preferably take place at a pressure in the range from 0.01 to 20 bar.

The polyamide or copolyamide finally obtained preferably has a melting point in the range from 110 to 350° C., particularly preferable in the range from 130 to 330° C.

Stage 5) can use any desired suitable vented extruders which permit discharge of water vapor and, if appropriate, of volatile monomers, e.g. diamines. Single-screw extruders or twin-screw extruders can preferably be used here. The prior art mentioned in the introduction gives more details of suitable extruders.

It is preferable that the reaction mixture from stage 2) is passed directly into the vented extruder in stage 5).

It is preferable that no additional water is fed into the stirred-tank reactor, and that no separate stage for the formation of monomer salts is undergone prior to the reaction in the stirred-tank reactor.

In the vented extruder it is possible to discharge not only water vapor but also unreacted monomers, e.g. diamines, and these can be returned to the process. A distillation stage can be inserted here.

The invention permits operation of a stirred-tank reactor in combination with a vented extruder. However, this leads to stoppage times for the vented extruder during the charging time and reaction time for the stirred-tank reactor. Preference is therefore given to alternating (swing-mode) operation of two or more stirred-tank reactors installed in parallel, their reaction products being introduced alternately to the vented extruder. The vented extruder can thus be supplied almost continuously with polyamide prepolymers (except during changeover times). While product is being discharged from one stirred-tank reactor into the extruder, fresh monomers can be supplied to the other stirred-tank reactor and this can be heated for the reaction. The dimensioning and number of the stirred-tank reactors can be adjusted appropriately as a function of capacity and residence time.

There can be further known work-up steps after the vented extruder. By way of example, the polyamide discharged from the extruder can be taken off as an extrudate and cooled in a waterbath, and pelletized to give cylindrical pellets. An extrudate take-off system, cooling system, and pelletizing system can therefore follow the extruder.

The process of the invention in particular permits the production of amorphous and semicrystalline polyamides and copolyamides, without formation of deposits on the walls of the stirred-tank reactor, while also forming only very small amounts of by-products. The end products can have very high melt viscosity. A very wide variety of polyamides can be produced, an example being PA 6I, based on hexamethylenediamine and isophthalic acid, PA 66, based on hexamethylenediamine and adipic acid, or PA 610, based on hexamethylenediamine and sebacic acid.

The examples below provide further explanation of the invention.

EXAMPLE 1: PRODUCTION OF A COPOLYAMIDE CONSTITUTED AS FOLLOWS

| Component | Weight |
|---|---|
| Hexamethylenediamine (HMD) | 7.75 kg |
| Dicyclohexylmethyldiamine (dicycan) | 10.54 kg |
| Adipic acid | 17.22 kg |
| Caprolactam | 15.15 kg |

Polycondensation:

HMD and dicycan were weighed into the feed vessel and inertized by flushing with nitrogen. The temperature was raised to 75°, with stirring, in order to melt these components. Adipic acid and caprolactam were weighed directly into the tank reactor and inertized before the diamine components were added to these. The temperature of the tank reactor was then raised to 220° C. These components reacted together in the reactor with elimination of water as condensate by-product. The reaction pressure increased with time, and reached 16 bar after 2 h. Once the pressure was constant, the reaction mixture was heated for a further two hours, using the same temperature, and then discharge was begun, using a ZDSK-30 twin-screw extruder and a feed rate of from 1 to 3 kg/h.

The product emerging from the extruder die was taken off in the form of extrudate, cooled in a waterbath, and pelletized to give cylindrical pellets. The viscosity of the products was analyzed by solution viscometry, and the value was displayed in the form of intrinsic viscosity. The polyamide specimens were dissolved in 96±0.1% sulfuric acid in order to prepare a 0.5% strength by weight polymer solution. The flow time of the solvent and of the polymer solution was determined at 25±0.05° C. waterbath temperature in an Ubbelohde viscometer.

Results:

| Specimen number | Feed rate into extruder | Intrinsic viscosity |
|---|---|---|
| 1 | 1 kg/h | 77 ml/g |
| 2 | 1.5 kg/h | 66 ml/g |
| 3 | 2 kg/h | 62 ml/g |
| 4 | 3 kg/h | 51 ml/g |

Example 1, which comprises hexamethylenediamine/dicycan/adipic acid/caprolactam in a ratio by weight of 1/1.36/2.22/1.95, was reproduced using a different monomer ratio:
Example 1a: 1/1.36/2.22/1
Example 1b: 2/1.36/4.44/1.95
The results were as follows:

| Specimen number | Feed rate into extruder | Intrinsic viscosity |
|---|---|---|
| 1a: 1 | 1 kg/h | 62 ml/g |
| 1a: 2 | 1.5 kg/h | 55 ml/g |
| 1a: 3 | 2 kg/h | 51 ml/g |
| 1a: 4 | 3 kg/h | 47 ml/g |
| 1b: 1 | 1 kg/h | 82 ml/g |
| 1b: 2 | 1.5 kg/h | 73 ml/g |
| 1b: 3 | 2 kg/h | 68 ml/g |
| 1b: 4 | 3 kg/h | 56 ml/g |

EXAMPLE 2: PRODUCTION OF A COPOLYAMIDE CONSTITUTED AS FOLLOWS

| Component | Weight |
|---|---|
| Hexamethylenediamine (HMD) | 7.75 kg |
| Dicyclohexylmethyldiamine (dicycan) | 10.54 kg |
| Adipic acid | 17.22 kg |
| Caprolactam | 15.15 kg |

Polycondensation:

HMD and dicycan were weighed into the feed vessel and inertized by flushing with nitrogen. The temperature was raised to 75°, with stirring, in order to melt these components. Adipic acid and caprolactam were weighed directly into the tank reactor and inertized before the diamine components were added to these. The temperature of the tank reactor was then raised to 220° C. These components reacted together in the reactor with elimination of water as condensate by-product. The reaction pressure increased with time, and reached 16 bar after 2 h. The reaction mixture was then heated using an external temperature of 280° C. until the pressure was 18 bar. Once the pressure was constant, the reaction mixture was heated using the same external temperature for a further two hours, and was then depressurized to 1 bar. The reaction mixture was further heated, for 1 hour at 1 bar, using the same external temperature.

The resultant prepolymer was finally discharged by using a ZDSK-30 twin-screw extruder and a feed rate of from 10 to 30 kg/h.

The product emerging from the extruder die was taken off in the form of extrudate, cooled in a waterbath, and pelletized to give cylindrical pellets. The viscosity of the products was analyzed by solution viscometry, and the value was displayed in the form of intrinsic viscosity. The polyamide specimens were dissolved in 96±0.1% sulfuric acid in order to prepare a 0.5% strength by weight polymer solution. The flow time of the solvent and of the polymer solution was determined at 25±0.05° C. waterbath temperature in an Ubbelohde viscometer.

Results:

| Specimen number | Feed rate into extruder | Intrinsic viscosity |
|---|---|---|
| 1 | 10 kg/h | 134 ml/g |
| 2 | 20 kg/h | 123 ml/g |
| 3 | 30 kg/h | 108 ml/g |

EXAMPLE 3: PRODUCTION OF A COPOLYAMIDE CONSTITUTED AS FOLLOWS

| Component | Weight |
|---|---|
| Hexamethylenediamine (HMD) | 7.75 kg |
| Dicyclohexylmethyldiamine (dicycan) | 10.54 kg |
| Adipic acid | 17.22 kg |
| Caprolactam | 15.15 kg |

Polycondensation:

HMD, dicycan, adipic acid, and caprolactam were dissolved at 20% by weight in water at 95° C. Once the stoichiometry had been set, the tank reactor was heated using an external temperature of 280° C. until the total pressure reached was 18 bar. Once pressure was constant, the reaction mixture was heated using the same external temperature for a further two hours, and then was depressurized to 1 bar. The reaction mixture was further heated for one hour at 1 bar, using the same external temperature.

The resultant prepolymer was finally discharged by using a ZDSK-30 twin-screw extruder and a feed rate of from 25 kg/h.

The product emerging from the extruder die was taken off in the form of extrudate, cooled in a waterbath, and pelletized to give cylindrical pellets. The viscosity of the products was analyzed by solution viscometry, and the value was displayed in the form of intrinsic viscosity. The polyamide specimens were dissolved in 96±0.1% sulfuric acid in order to prepare a 0.5% strength by weight polymer solution. The flow time of the solvent and of the polymer solution was determined at 25±0.05° C. waterbath temperature in an Ubbelohde viscometer.

Results:

| Specimen number | Feed rate into extruder | Intrinsic viscosity |
|---|---|---|
| 1 | 25 kg/h | 124 ml/g |

EXAMPLE 4: PRODUCTION OF POLYAMIDE CONSTITUTED AS FOLLOWS

| Component | Weight |
|---|---|
| HMD | 36.378 kg |
| Sebacic acid | 63.315 kg |

Polycondensation:

HMD was weighed into the feed vessel and inertized by flushing with nitrogen. The temperature was raised to 75° C., with stirring, in order to melt these components. Sebacic acid was weighed directly into the tank reactor, and inertized with nitrogen, before the HMD was added to the reactor. The temperature of the tank reactor was then raised to 220° C. The diamine and the diacid reacted together with elimination of water as condensate by-product. The reaction pressure increased with time, and reached 17.5 bar after 2.5 h. Once the pressure was constant, the reaction mixture was heated for a further two hours, using the same temperature, and then discharge was begun, using a ZDSK-30 twin-screw extruder and a feed rate of from 1 to 3 kg/h.

The product emerging from the extruder die was taken off in the form of extrudate, cooled in a waterbath, and pelletized to give cylindrical pellets. The viscosity of the products was analyzed by solution viscometry, as described at an earlier stage above.

Results:

| Specimen | Feed rate into extruder | Intrinsic viscosity |
|---|---|---|
| 1 | 2.2 kg/h | 71 ml/g |

EXAMPLE 5: POLYAMIDE BASED ON CAPROLACTAM, HEXAMETHYLENEDIAMINE, ADIPIC ACID, AND DICYCAN

In this process, the monomers were dissolved in water at 90° C. Water was charged to a stirred tank which served as feed tank for the stirred tank reactor that followed. The liquid monomers (hexamethylenediamine and dicycan) were then added, and this was followed by addition of the solid monomers. Heating to 90° C. and mixing gave an aqueous solution of the monomers with the following composition:

| Component | Weight |
|---|---|
| Water | 20 kg |
| Caprolactam | 24.2 kg |
| Adipic acid | 11.8 kg |
| Dicycan | 17 kg |
| AH salt | 26.7 kg |

After homogenization of the monomers, a specimen was taken in order to determine pH. pH was then corrected by adding small amounts of the missing monomer. After pH measurement and correction, the monomer solution was transferred to a stirred tank reactor of capacity 150 l. Using a jacket temperature of 280° C., the reactor was heated to give an internal pressure of 18 bar/abs. The pressure was held constant via a pressure-control valve, until most of the water had been removed from the reactor. The pressure was then slowly discharged to give atmospheric pressure within a period of 60 minutes. Once atmospheric pressure had been reached, the reactor was flushed with a stream of nitrogen at 300 l/h for 30 minutes. The reactor was then closed and the mixture was stirred for a further 30 minutes. The reactor was then pressurized with nitrogen at 16 bar/abs, in order to discharge the product from the reactor.

The prepolymer produced in the stirred tank reactor was discharged via a corotating vented twin-screw extruder. The discharge rate was controlled by a pump located directly above the extruder. The prepolymer was postcondensed in the extruder until the desired molecular weight had been reached, with devolatilization to remove the water of reaction. The temperature in the extruder was 220° C., and the rotation rate was 200 revolutions per minute. The discharge rate was 25 kg/h.

The polymer strands emerging from the extruder were cooled in a water bath and pelletized.

The properties obtained were as follows:

| Intrinsic viscosity: | 125 ml/g |
|---|---|
| Carboxy end groups: | 64 mmol/kg |
| Amino end groups: | 65 mmol/kg. |

EXAMPLE 6: PRODUCTION OF NYLON-6,10

In this process, the monomers were dissolved in water at 90° C. Water was charged to a stirred tank which served as feed tank for the stirred tank reactor that followed. Hexamethylenediamine was then added, and this was followed by addition of sebacic acid. Heating to 90° C. and mixing gave an aqueous solution of the monomer salt with the following composition:

| Component | Amount |
|---|---|
| Water | 35 kg |
| Hexamethylenediamine | 42.1 kg |
| Sebacic acid | 23.8 kg |

After homogenization of the monomers, a specimen was taken in order to determine pH. pH was then corrected by adding small amounts of the missing monomer.

After pH measurement and correction, the monomer solution was transferred to a stirred tank reactor of capacity 150 l.

Using a jacket temperature of 290° C., the reactor was heated to give an internal pressure of 18 bar/abs. The pressure was held constant via a pressure-control valve, until most of the water had been removed from the reactor. The pressure was then slowly discharged to give atmospheric pressure within a period of 80 minutes. As soon as atmospheric pressure had been reached, the reactor was closed and pressurized with nitrogen at 16 bar/abs. and the mixture was stirred for a further 60 minutes.

The resultant prepolymer was then passed directly from the stirred tank reactor into a corotating vented twin-screw extruder. The discharge rate was controlled by a pump arranged directly above the extruder. The prepolymer was postcondensed in the extruder until the desired molecular weight had been reached, with devolatilization to remove the water of reaction. The temperature in the extruder was 230° C., and the rotation rate was 180 revolutions per minute. The discharge rate was 20 kg/h. The polymer strands from the extruder were cooled in a water bath and pelletized.

The properties obtained were as follows:

| Intrinsic viscosity: | 147 ml/g |
|---|---|
| Carboxy end groups: | 66 mmol/kg |
| Amino end groups: | 53 mmol/kg. |

EXAMPLE 7: PRODUCTION OF NYLON-6,10

The monomers were treated as described in example 6, using a composition as in that example. The remainder of the production process follows the process according to example 6, except that the pressure in the stirred tank reactor was reduced to 3 bar/abs. within a period of 80 minutes. The reactor was then closed and pressurized with nitrogen at 17 bar/abs., and the mixture was stirred for a further 60 minutes.

The rotation rate in the extruder that followed was 240 revolutions per minute, with a discharge rate of 32 kg/h.

The properties of the polyamide obtained were as follows:

| | |
|---|---|
| Intrinsic viscosity: | 112 ml/g |
| Carboxy end groups: | 85 mmol/kg |
| Amino end groups: | 70 mmol/kg |

EXAMPLE 8: PRODUCTION OF NYLON-6,10

The starting monomers were treated as described in example 6. The remainder of the production process was also as described in example 6, except that the pressure in the stirred tank reactor was reduced slowly to 1.3 bar/abs. within a period of 80 minutes. The reactor was then closed and pressurized with nitrogen at 17 bar/abs., and the mixture was stirred for a further 60 minutes. The rotation rate in the extruder that followed was 240 revolutions per minute with a discharge rate of 30 kg/h.

The properties of the polyamide obtained were as follows:

| | |
|---|---|
| Intrinsic viscosity: | 129 ml/g |
| Carboxy end groups: | 70 mmol/kg |
| Amino end groups: | 54 mmol/kg |

EXAMPLE 9: PRODUCTION OF NYLON-6,10

The preparation of the monomers and the production process were as in example 6. The pressure was reduced as described in example 6 to atmospheric pressure within a period of 80 minutes. Once atmospheric pressure had been reached, the reactor was flushed for 15 minutes with a stream of nitrogen at 300 l/h. The reactor was then closed and pressurized with nitrogen at 17 bar/abs., in order to discharge the product from the reactor. The remainder of the production process was as described in example 6, the discharge rate from the extruder being 14 kg/h.

The properties of the polyamide obtained were as follows:

| | |
|---|---|
| Intrinsic viscosity: | 171 ml/g |
| Carboxy end groups: | 54 mmol/kg |
| Amino end groups: | 42 mmol/kg |

EXAMPLE 10: PRODUCTION OF NYLON-6,6

In this process, 85 kg of AH salt and 15 kg of water were charged to a stirred tank reactor of capacity 150 l. The reactor was then heated to a jacket temperature of 300° C. in order to obtain an internal pressure of 15.5 bar/abs. The pressure was held constant via a pressure-control valve until most of the water had been removed from the reactor. The pressure was then slowly reduced to atmospheric pressure within a period of one hour. As soon as atmospheric pressure had been reached, the reactor was flushed for 15 minutes with a stream of nitrogen at 300 l/h. The reactor was then closed and pressurized with nitrogen at 16 bar/abs., in order to discharge the product from the reactor.

The reaction in the extruder was operated as in example 6, the temperature being 270° C., the rotation rate being 240 revolutions per minute, and the discharge rate being 30 kg/h.

The properties of the polyamide obtained were as follows:

| | |
|---|---|
| Intrinsic viscosity: | 157 ml/g |
| Carboxy end groups: | 46 mmol/kg |
| Amino end groups: | 72 mmol/kg |

EXAMPLE 11: POLYAMIDE BASED ON HEXAMETHYLENEDIAMINE, TEREPHTHALIC ACID, ISOPHTHALIC ACID, AND META-XYLYLENEDIAMINE

In this process, the monomers were dissolved in water at 95° C. Water was charged to a stirred tank, which served as feed tank for the stirred tank reactor that followed. The liquid monomers (hexamethylenediamine and meta-xylylenediamine) were then added, followed by the acid monomers. Heating to 95° C. and mixing gave an aqueous solution of the monomers with the following composition:

| Component | Amount |
|---|---|
| Water | 66 kg |
| Isophthalic acid | 11.12 kg |
| Terephthalic acid | 20.54 kg |
| Hexamethylenediamine | 21.11 kg |
| meta-Xylylenediamine | 1.21 kg |

The remainder of the production process was as described in example 6. The reactor was heated to a jacket temperature of 280° C. in order to achieve an internal pressure of 25 bar/abs. The pressure was held constant via a pressure-control valve until most of the water had been removed from the reactor. The resultant prepolymer was then passed from the stirred tank reactor into the corotating vented twin-screw extruder. The discharge rate was controlled by a discharge valve arranged directly above the extruder. This valve was heated to a temperature of 340° C. The prepolymer was postcondensed in the extruder until the desired molecular weight had been reached, with devolatilization of water. The temperature in the extruder was 320° C., and the rotation rate was 160 revolutions per minute. The discharge rate was 30 kg/h.

The strands discharged from the extruder were cooled in a water bath and pelletized. The properties obtained were as follows:

Intrinsic viscosity of 113 ml/g at throughput 5 kg/h, 91 ml/g at 10 kg/h, 78 ml/g at 15 kg/h, 65 ml/g at 20 kg/h, 55 ml/g at 30 kg/h.

The invention claimed is:

1. A batch process for the production of copolyamides, the copolyamides being the reaction products of monomers consisting of
   a) at least one aliphatic dicarboxylic acid having from 4 to 18 carbon atoms; and
   b) at least one aliphatic diamine having from 4 to 16 carbon atoms,
   said process comprising
   1) feeding the entire amount of the at least one aliphatic dicarboxylic acid and the at least one aliphatic diamine, in the desired stoichiometry, in a closed stirred-tank reactor to provide a reaction mixture, 2) heating the monomer mixture in the stirred-tank reactor, with stirring, and with setting of a certain pressure, to a desired reaction temperature for the production of a prepolymer, wherein the reaction in stage 2) is carried out at a temperature in the range from 120 to 320° C. and at a maximum pressure in the range from 3 to 100 bar and the reaction in the stirred-tank reactor is terminated once the conversion reached is in the range from 50 to 97%, based on the amino groups and carboxy groups, wherein the intrinsic viscosity of the prepolymer is in the range from 3 to 200 ml/g, determined by solution viscometry, and 5) reacting the reaction mixture from stage 2) in the melt in a vented extruder for further increase of the molecular weight, with discharge of water vapor, and without use of additional polyamide-forming monomers or of polyamides, at a temperature in the range from 120 to 370° C. and at a pressure in the range from 0.01 to 20 bar, the copolyamide produced in stage 5) having a crystallinity of at least 20%, wherein the reaction mixture from stage 2) is passed directly into the vented extruder in stage 5) and two or more stirred-tank reactors installed in parallel are operated alternately, and their reaction products are introduced alternately to the vented extruder.

2. The process according to claim 1, wherein, prior to the reaction in the stirred-tank reactor, no separate stage is undergone for the formation of monomer salts.

3. The process according to claim 2, wherein no water is fed into the stirred-tank reactor.

4. The process according to claim 1, wherein, in the vented extruder, not only water vapor but also unconverted monomers are discharged, these being returned to the process.

5. The process according to claim 1, wherein the melting point of the resultant copolyamides is from 110 to 350° C.

6. The process according to claim 1, wherein the at least one aliphatic diamine is selected from the group consisting of butanediamine, hexamethylenediamine, octanediamine, decanediamine and any one mixture thereof.

7. The process according to claim 1, wherein the at least one aliphatic dicarboxylic acid is selected from the group consisting of adipic acid, sebacic acid, dodecanedoic acid, tetradecandoic acid, and any one mixture thereof.

8. A batch process for the production of copolyamides, the copolyamides being the reaction products of monomers consisting of a) at least one aliphatic dicarboxylic acid having from 4 to 18 carbon atoms; and b) at least one aliphatic diamine having from 4 to 16 carbon atoms, said process comprising 1) feeding the entire amount of the at least one aliphatic dicarboxylic acid and the at least one aliphatic diamine, in the desired stoichiometry, in a closed stirred-tank reactor, and wherein no water is fed into the stirred-tank reactor to provide a reaction mixture, 2) heating the monomer mixture in the stirred-tank reactor, with stirring, and with setting of a certain pressure, to a desired reaction temperature for the production of a prepolymer, wherein the reaction in stage 2) is carried out at a temperature in the range from 120 to 320° C. and at a maximum pressure in the range from 3 to 100 bar and the reaction in the stirred-tank reactor is terminated once the conversion reached is in the range from 50 to 97%, based on the amino groups and carboxy groups, wherein the intrinsic viscosity of the prepolymer is in the range from 3 to 200 ml/g, determined by solution viscometry, and 5) reacting the reaction mixture from stage 2) in the melt in a vented extruder for further increase of the molecular weight, with discharge of water vapor, and without use of additional polyamide-forming monomers or of polyamides, at a temperature in the range from 120 to 370° C. and at a pressure in the range from 0.01 to 20 bar, the copolyamide produced in stage 5) having a crystallinity of at least 20%, wherein the reaction mixture from stage 2) is passed directly into the vented extruder in stage 5) and two or more stirred-tank reactors installed in parallel are operated alternately, and their reaction products are introduced alternately to the vented extruder.

* * * * *